United States Patent Office 2,715,615
Patented Aug. 16, 1955

2,715,615
PLASTIC COMPOSITIONS COMPRISING A VINYL CHLORIDE POLYMER AND A HIGH SOFTENING POINT-COAL TAR PITCH

John M. De Bell, Longmeadow, and Mortimer H. Nickerson, Springfield, Mass., assignors to Orangeburg Manufacturing Co., Inc., Orangeburg, N. Y., a corporation of New York No Drawing. Application September 3, 1952, Serial No. 307,717

7 Claims. (Cl. 260—28.5)

This invention relates to compositions of matter including coal tar pitch and vinyl chloride polymer resins, and has for its object the provision of improved compositions of this character. The invention provides thermoplastic compositions consisting essentially of coal tar pitch of the relatively high temperature softening point type, and a vinyl chloride polymer resin. In a more complete form, the invention provides compositions comprising thermoplastic compositions and varying amounts of filler, which compositions are characterized by form stability at temperatures appreciably above normal outside temperatures. The compositions of the invention may be molded into form-stable articles having good appearance and improved physical and chemical properties.

Coal tar pitch is the residual produced from the distillation of coal tars which in turn are by-products from the destructive distillation of coal in the manufacture of coke or fuel gas. Coal tar pitch is known to be useful in the construction of articles subject to exposure to the elements, and is particularly effective where protection against corrosion is required, but it is unsatisfactory for many purposes because articles formed thereof, even though reinforced with various inert fillers, have little structural strength. Coal tar pitches are available in a variety of softening points. The softer pitches flow or form, while the harder pitches are quite brittle at the prevailing atmospheric temperatures and are not suitable for molded articles requiring both strength and rigidity.

The vinyl chloride polymer resins, typical of which are polyvinyl chloride polymer resin and suitable copolymers of vinyl chloride, are tough and rigid and must be plasticized by some material for most molding purposes. It has been generally understood that these vinyl chloride polymer resins do not blend readily with the harder pitches.

We have found that, contrary to the present generally existing belief concerning the plasticizing of vinyl chloride polymer resins, these resins are compatible with high temperature and harder coal tar pitch, and when compounded therewith, the ingredients coact in a unique manner to produce highly desirable results. When a compound comprising vinyl chloride polymer resin and pitch is raised to a high temperature, at which the pitch is fluid, the pitch is an excellent plasticizer for the relatively hard and horny resin, thereby producing a composition which is easily moldable to a variety of complex shapes without the use of special techniques or molding equipment. On the other hand, at low temperatures such as those to which molded articles are subjected in use, and at which the pitch alone would revert to a hard, brittle material, the resin modifies the pitch and imparts a high degree of toughness, strength and rigidity to the composition. Furthermore, at temperatures in the upper range of those encountered in use, say from about 120° to 180° F., the pitch raises the softening point of the composition.

For the purposes of this invention, we prefer to use coal tar pitches made from high temperature tars produced by coke ovens and gas works from bituminous coals because of their greater stability, chemical, oil and grease resistance, etc. Grades of coal tar pitch suitable for the invention are readily distinguishable, for example, by their ball and ring softening point values which range from about 160° to 350° F. Pitches within the range of 160° F. to 305° F., more particularly from 285° F. to 305° F., are especially effective to form compositions for molded articles requiring relatively great strength and rigidity, such as pipe fittings. In general, with a given proportion of pitch to vinyl chloride polymer resin, the higher the softening point of the pitch used, the higher the temperature required to produce deformation of the compound under loading.

The resin ingredient of our improved composition is herein generally designated as vinyl chloride polymer resin, which term is used to embrace the polyvinyl chloride resins as well as the copolymers of vinyl chloride with vinyl acetate, ethyl maleate or ethyl or methyl acrylate, and the like, in which the vinyl chloride is in the major proportion. While the above examples of copolymers are useful, they are not to be interpreted as completely describing all of the useful copolymers and therefore limiting the invention. Since the vinyl chloride component is the one which has been demonstrated as being compatible with coal tar pitch, any copolymer having 80 per cent or more of copolymerized vinyl chloride will also be effective and useful.

Polyvinyl chloride resins are marketed under various trade names such as Geon 101, Marvinol VRIO, Exon 300, and Ultron. Copolymers of vinyl chloride and vinyl acetate are known by the trade-name of Vinylite and are given various grade designations such as VYHH (about 85% vinyl chloride), VYNS (about 90% vinyl chloride), and VYNW1 (about 95% vinyl chloride). Copolymers of vinyl chloride and ethyl maleate or ethyl or methyl acrylate in which the chloride is in the major proportion are known under various trade names, such as Pliovic A, Geon 400X65, and Exon 405. It is customary in compounding these resins to add a heat and light stabilizer, a simple and effective one being finely divided white lead added to about 3% to 5% of the vinyl polymer resin weight. There are on the market a wide variety of heat and light stabilizers for vinyl chloride type resins, and the use of any one or more of these in combination is within the scope of this invention. The vinyl chloride polymer resins referred to herein and in the appended claims are preferably resins that have been effectively stabilized by the above or other known stabilizers. High strength and toughness are associated with the high molecular weight polyvinyl chloride resins which also are the most difficult to mold. Lower molecular weight polyvinyl chloride resins sacrifice a little strength but are considerably easier to mold. When a sufficiently wide choice of polyvinyl chloride resins that are easily moldable in available equipment cannot be readily or economically obtained, mixtures of the available polyvinyl chloride resin and a resin that is a copolymer of vinyl chloride with vinyl acetate, ethyl maleate or ethyl or methyl acrylate are used with good effect to produce the desired ease of moldability in the pitch compositions. Vinyl chloride copolymers can also be used alone without polyvinyl chloride resin.

Compared to pitch, the vinyl chloride polymer resins are relatively high prived and suffer from the disadvantage that they are not readily extendable with low cost inert fillers without appreciable loss in strength. It is general practice not to make vinyl chloride polymer resin compounds of this type which contain more than 23% inert filler. Unless plasticized with a liquid plasticizer they are very difficult to mold, particularly in large sections and in cases where the molded article is complex in shape. If plasticized by conventional liquid plasticizers, the article then has poor resistance to deformation by heat. However, we have found that compositions obtained by blending these vinyl chloride polymer resins with coal tar pitch are remarkably extensible with inert filler, without loss in strength, and that with proper selection of pitch grade and filler, an actual increase in resistance to heat deformation results. In contrast to the vinyl chloride polymers, the blend of coal tar pitch and vinyl chloride polymer resin can be extended with, for example, asbestos fiber, to such an extent that the composition contains 50% of filler and produces a molding material which has completely satisfactory characteristics.

A further advantage of these composition is that they may be readily compounded and molded by the procedures customarily used in the plastics industry. For example, it was found convenient to prepare mixtures in the following way: The vinyl chloride polymer resin is heated on a differential roll mill of usual type at about 300° F. to 320° F., ground or molten pitch is then added slowly to the material on the mill while banding, folding, and stripping are done by the usual technique of mill compounding until the required amount of pitch has been added. In order to keep the mixture in the mill coherent, filler may be added along with the pitch as necessary. In this manner, all the required amount of pitch and filler is added and a homogeneous composition is obtained. This composition can be compression or injection molded or extruded to any desired shape. The compound is thermoplastic and therefore must be handled by the usual procedure for thermoplastic materials.

Compositions of the type described above possess certain unique advantages because of a particular characteristic of the coal tar pitch. It is subject to large changes in viscosity with change in temperature. At ordinary room temperatures, coal tar pitch can be a hard brittle material, but at temperatures in the order of 330° F. or 340° F. it is very fluid. This property of pitch makes it particularly useful in conjunction with vinyl chloride polymer resins since at molding temperatures of 320° F.–350° F. it imparts the useful properties of a liquid plasticizer and gives the material great plasticity and corresponding ease of moldability. At room temperatures, however, or even at temperatures up to 160° F.–180° F., the higher melting point pitches exist as hard solids and exert no plasticizing action on the vinyl chloride polymer resins even though remaining compatible with them. Therefore, in practice the pitch accomplishes a dual purpose, since at room temperatures and temperatures to which the molded article may be subjected in normal use, it provides rigidity to the article and increased resistance to deformation by heat, which property is supplemented by the presence of the completely unplasticized vinyl chloride polymer resin. However, at molding temperatures, where ease of formation of the article is highly desirable, the pitch acts as a true plasticizer and greatly facilitates molding, whereas a completely unplasticized vinyl chloride polymer resin would be exceedingly difficult to mold in a required large section. Further, resistance to petroleum oils and greases is not impaired by the use of coal tar pitch.

The property of imparting rigidity and ability to withstand deformation under load at normal or even somewhat elevated temperature is characteristic only of the higher melting point pitches, more specifically those whose softening points by the ball and ring method lie at or above 160° F. Pitches which in themselves are soft at temperatures below this point have no utility in this invention, since they would exert a plasticizing and softening action at these low temperatures. Coal tar is thus incapable of meeting the requirements that the molded product from the composition be form-stable under load at temperatures up to 140° F. Composition 2, described more fully later in this application, illustrates the complete lack of form stability at 140° F. which results when even a relatively small amount of liquid plasticizer is introduced into the composition.

Following are four examples illustrating some of the methods used to prepare these compositions, and the properties of the product:

*Example 1*

70 parts by weight of coal tar pitch having a ball and ring softening point of 160° F. were blended on a differential mill roll with 30 parts by weight Geon 101 which contained 3% of white lead. The product at room temperature was a hard, tough black compound considerably less brittle than pitch.

*Example 2*

70 parts of coal tar pitch having a softening point of 160° F. were blended with 30 parts of Geon 101 on a differential mill roll at 280° F. to 300° F. and 70 parts of wood flour were added and thoroughly mixed. The product at room temperature was hard and tough and was readily molded in a 2 inch disk mold to produce disks which had a glossy finish and which were markedly less brittle than the material molded only of pitch.

*Example 3*

55 parts of Marvinol VRIO and 10 parts of Vinylite VYHH were mixed with 2 parts of white lead and sheeted on a differential mill roll at 310° F. 35 parts of coal tar pitch having a softening point of 160° F. were then added and worked in followed by 100 parts of asbestos. This product was readily moldable into various shapes having good finish and great toughness and showing good resistance to heat distortion at 140° F.

*Example 4*

35 parts of Marvinol VRIO and 35 parts of Vinylite VYHH mixed with 3% of white lead were banded on a differential mill at 310° F. and 35 parts of coal tar pitch having a softening point of 265° F. were blended in, followed by 100 parts of asbestos. The resulting compound was readily moldable in a transfer press to produce test rings of 4 inches inside diameter and 5/16 inch thick. When placed in an oven at 160° F. temperature and tangentially loaded with weights equal to 110 pounds per linear foot of loading, they showed a heat deflection of only 150 mils. Even better heat distortion resistance is obtained by using pitch of 285° F. to 300° F. and slightly raising the milling and molding temperatures.

While the foregoing examples show variations in per cent of pitch from 35% to 70%, actually, experiments with a variety of different grades of pitch varying in softening points from 130° F. to 310° F. and with vinyl polymer resins ranging from 100% polyvinyl chloride such as Marvinol VRIO, Geon 101 etc. down to copolymers in which the vinyl chloride is present to the extent of 85% have shown that the various pitches and vinyl polymers are compatible in all proportions.

The type and amount of filler is dictated to a large extent by the properties desired in the final composition. The vinyl chloride polymer resin-pitch compound is capable of taking considerable quantities of the common fillers such as clay, wood flour, walnut shell flour, or asbestos. Although the amount of filler may be varied considerably, it is advantageous to add an amount that will make the maximum contribution to the strength and resistance to heat distortion of the finished product. One will normally extend the mixture by the addition of filler to the fullest amount which will retain the strength and heat resistance characteristics required in the composition.

The filler, in addition to lowering the cost of the composition, also contributes to the resistance to heat deformation. In this respect it acts primarily as a viscosity increasing ingredient, and accordingly the compounder will select his grade and type of filler with this in mind. Choice of filler may also be dictated by end use. For example, in underground piping, it is advantageous to use a mineral filler, such as asbestos, for maximum resistance to water, chemicals and decay organisms. If these factors do not apply and lightness in weight is desirable, then an organic filler such as wood or walnut shell flour or cork dust may be used. It is one of the striking advantages of this vinyl chloride polymer resin-pitch combination that the user is allowed a wide choice and range of filler, both as to type and amount to be used.

While any suitable form and grade of asbestos may be used as a filler depending upon the properties of the product, we prefer to use Canadian Chrysotile asbestos which is available in several grades. The long fiber asbestos gives greater resistance to heat deformation than the shorter fiber lengths.

The following tabulation shows the results of comparative impact strength tests and of heat distortion tests on compositions embodying the invention (Nos. 3, 4, 5, 6, 7, 9, 10 and 11) and on vinyl chloride polymer resin compositions (Nos. 1, 2 and 8). The impact strength tests were made on bar samples ½" x ½" in cross section and notched to a depth of 0.1 inch. They were tested in a Baldwin impact machine in the manner of an Izod bar test and the foot pounds to break measured. The heat distortion tests were made on rings of 4" inside diameter and 0.32" thickness, loaded diametrically with a weight of 110 lbs. per axial foot, the results being given in terms of the flattening distortion in mils. Figures before ingredients are parts by weight. The values given are the averages of four tests.

RESULTS OF HEAT DISTORTION TESTS

| Compositions | (Mils Flattening of Diameter) | | | |
|---|---|---|---|---|
| | 120° F. (48 hrs.) | 140° F. (24 hrs.) | 160° F. (12 hrs.) | 180° F. (6 hrs.) |
| 1. 50 VYHH<br>50 Marvinol Vrio<br>Impact strength—0.265 ft. lbs. | 36 | 164 | (¹) | |
| 2. 50 VYHH<br>50 Marvinol Vrio<br>30 Asbestos<br>10 Dioctyl phthalate<br>Impact strength—0.188 ft. lbs. | 847 | (¹) | | |
| 3. 50 VYHH<br>50 Marvinol Vrio<br>50 Pitch (265°)<br>Impact strength—0.115 ft. lbs. | 37 | 310 | (¹) | |
| 4. 33 VYHH<br>33 Marvinol Vrio<br>33 Pitch (265°)<br>100 Asbestos<br>Impact strength—0.150 ft. lbs. | 4 | 22 | 150 | 416 |
| 5. 33 VYHH<br>33 Marvinol Vrio<br>33 Pitch (301°)<br>100 Asbestos<br>Impact strength—0.150 ft. lbs. | 3 | 12 | 52 | 188 |
| 6. 33 VYHH<br>33 Marvinol Vrio<br>33 Pitch (265°)<br>125 Asbestos<br>Impact strength—0.150 ft. lbs. | 3 | 16 | 108 | 242 |
| 7. 50 VYHH<br>50 Marvinol Vrio<br>50 Pitch (301°)<br>Impact strength—0.128 ft. lbs. | 20 | 108 | 1,900 | |
| 8. 35 VYHH<br>35 Marvinol Vrio<br>14 Dioctyl phthalate<br>100 asbestos<br>Impact strength—0.153 ft. lbs. | 341 | 668 | (¹) | |
| 9. 1 Marvinol Vrio<br>1 Exon 405<br>1 Pitch (265°–285°)<br>3 Asbestos<br>Impact strength—0.210 ft. lbs. | 22 to 23 | 27 to 35 | 36 to 60 | 392 to 457 |
| 10. 0.66 Marvinol Vrio<br>1.34 Exon 405<br>1 Pitch (265°–285°)<br>3 Asbestos<br>Impact strength—0.155 ft. lbs. | 0 to 6 | 9 to 14 | 78 to 87 | 806 to 901 |
| 11. 2 VYNS<br>1 pitch (265°–285°)<br>3 Asbestos<br>Impact strength—0.189 ft. lbs. | 9 to 13 | 10 to 26 | 235 to 255 | 1,231 to 1,445 |

¹ Collapsed.

Composition 1 had the highest impact strength because it was made of pure vinyl chloride polymer resin. Composition 2 had been filled with asbestos and it was necessary to add liquid plasticizer in order to give a moldable composition. The impact strength fell off markedly and the material distorted badly under heat and load. In composition 3, without filler, the impact strength was low since the tendency of the pitch is to dilute the strength of the vinyl chloride polymer resin somewhat and cause increased brittleness, but the resistance to heat distortion improved. Composition 4 is one important type of composition of the invention and the significant thing to be noted is that the addition of asbestos to this combination of coal tar pitch and vinyl chloride polymer resin increased the impact strength, whereas the opposite was true when asbestos was added to a vinyl chloride polymer resin containing no pitch. Composition 5 showed the same impact strength as composition 4 with a different softening point pitch. In composition 6, there was added as much asbestos to the standard composition as possible and moldability was still retained. The most that the asbestos could be increased was 25%. Larger amounts could not be molded in the equipment because the composition was too stiff. The impact strength remained the same.

Composition 7 is the same as 3, except for the higher melting point pitch. The resistance to heat distortion is markedly greater than in composition 1 which contained no pitch. There was only a slight increase in impact strength. In composition 8 it will be noted that the impact strength had fallen from that obtained in 2 where less asbestos was used. The amount of plasticizer used in composition 8 was the absolute minimum which could have been used and give moldability. Moreover, this composition was so heavily loaded with asbestos that it could hardly be molded, yet its heat distortion resistance was very much lower than the mixtures using pitch, as in compositions 4 and 5.

Composition 9 showed exceptionally high impact strength with good heat distortion resistance. The change in proportions of resins in composition 10 reduced the impact strength somewhat but gave a useful composition. Composition 11 is an example of the composition using vinyl chloride copolymer as the sole vinyl polymer resin ingredient.

All compositions contained 3% of white lead based on the vinyl chloride polymer resin content. No stearate or other lubricant was used, although the use of minor amounts of these materials according to common practice is not precluded and is within the scope of this invention. The procedure was to mix the ingredients thoroughly in powder form and then flux and preheat on a mill at roll temperatures of 315° F.–320° F. The hot material directly from the mill was transfer molded at 275° F. Clamping pressure on the mold was by means of an 8 inch diameter ram at 3000 p. s. i. The transfer ram was 3½ inches in diameter and operated at 1800 to 2250 p. s. i. depending upon the stiffness of the compound. Bars and rings were molded in different parts of the same mold, but not simultaneously.

The pitches in the range of 285° F. to 305° F. are the most effective for forming such fittings as L's, T's and Y's. Such fittings may be produced according to copending application Serial No. 96,774, filed June 2, 1949 and now abandoned. These compositions are of particular advantage in forming pipe and pipe fittings that are connected in liquid-tight sealed relation by tapered joints, and this by merely driving one tapered part into another, as is disclosed in the aforesaid copending application. The improved composition of the present invention, when molded into pipe or pipe fittings having such tapered seal joints, readily produces tight and permanent pipe section and fitting connections with a minimum of labor and materials.

The fittings can be used in place of the relatively heavy and expensive metal, clay and cement fittings now used.

The fittings of the invention possess the advantages of light weight, great strength and toughness, fungus, decay, oil, grease and chemical resistance and give the significant advantages of being effectively adaptable to the formation and use of tapered driven joints so important in bituminized fiber pipe.

This application is a continuation-in-part of our copending application Serial No. 180,124, filed August 18, 1950, entitled "Plastic Compositions" and now abandoned.

We claim:

1. A thermoplastic resin composition, form stable at temperatures up to 140° F., comprising vinyl chloride polymer resin selected from the group consisting of polyvinyl chloride and the copolymers of vinyl chloride in which over 80% of the resin content of the copolymer is vinyl chloride, and a lesser amount of coal tar pitch having a softening point by the ball and ring method of at least 160° F. and fluid at the molding temperature of the resin, said pitch comprising the sole plasticizing agent present in the composition.

2. A thermoplastic molding composition according to claim 1 in which the vinyl chloride polymer resin is selected from the group consisting of polyvinyl chloride and the copolymers of vinyl chloride and vinyl acetate, of vinyl chloride and ethyl maleate, of vinyl chloride and methyl acrylate, and of vinyl chloride and ethyl acrylate.

3. A thermoplastic molding composition as in claim 1 in which the coal tar pitch has a softening point by the ball and ring method in the range of 285° F. to 305° F.

4. A thermoplastic molding composition as in claim 2 in which the coal tar pitch has a softening point by the ball and ring method in the range of 285° F. to 305° F.

5. A thermoplastic molding composition according to claim 1 and containing an inert filler up to 50% of the composition by weight.

6. A thermoplastic molding composition according to claim 2 and containing an inert filler up to 50% of the composition by weight.

7. A thermoplastic molding composition according to claim 2 comprising, by weight, substantially two parts vinyl chloride polymer resin, one part coal tar pitch and three parts by weight of a filler selected from the group consisting of clay and asbestos.

References Cited in the file of this patent

UNITED STATES PATENTS

| 2,635,085 | Gonnard et al. | Apr. 14, 1953 |

FOREIGN PATENTS

| 581,368 | Great Britain | Oct. 10, 1946 |
| 602,582 | Great Britain | May 28, 1948 |
| 662,749 | Great Britain | Dec. 12, 1951 |
| 958,429 | France | Sept. 12, 1949 |